United States Patent [19]

Ballendux et al.

[11] 4,399,900
[45] Aug. 23, 1983

[54] CENTRIFUGAL HYDRAULIC HEAD RELIEF VALVE

[75] Inventors: Gerardus M. Ballendux, Waukesha; Robert E. Schott, New Berlin, both of Wis.

[73] Assignee: Allis-Chalmers Corporation, Milwaukee, Wis.

[21] Appl. No.: 219,261

[22] Filed: Dec. 22, 1980

[51] Int. Cl.³ ............. F16D 25/063; F16D 25/14
[52] U.S. Cl. .................... 192/106 F; 91/442; 192/85 AA
[58] Field of Search .......... 192/106 F, 85 AA, 85 A, 192/103 FA, 104 F; 91/433, 442; 137/505.13

[56] References Cited

U.S. PATENT DOCUMENTS

| | | | |
|---|---|---|---|
| 2,297,480 | 9/1942 | Kratzmann | 192/106.F |
| 2,588,724 | 3/1952 | Hobbs et al | 192/85.AA |
| 2,642,844 | 6/1953 | Flinn | 192/106.F |
| 2,864,479 | 12/1958 | Schindler | 192/106.F |
| 2,909,256 | 10/1959 | Chung | 192/106.F |
| 3,094,203 | 6/1963 | Jania et al | 192/106.F |
| 3,534,840 | 10/1970 | Snoy | 192/106.F |
| 3,762,520 | 10/1973 | Busch | 192/106.F |
| 4,186,829 | 2/1980 | Schneider et al | 192/85.AA |

Primary Examiner—Rodney H. Bonck
Attorney, Agent, or Firm—Arthur L. Nelson

[57] ABSTRACT

A pressure responsive relief valve closing responsive to clutch actuating pressure and opening responsive to centrifugal forces and a spring force to relieve residual pressure in the hydraulic actuator of a rotating clutch to avoid clutch drag.

10 Claims, 3 Drawing Figures

CENTRIFUGAL HYDRAULIC HEAD RELIEF VALVE

This invention relates to a friction clutch, and, more particularly, to a centrifugal hydraulic head relief valve in a rotating clutch in communication with a hydraulic actuator for closing in response to clutch actuating pressure and opening responsive to centrifugal force and a spring force acting on the valve to relieve residual pressure in the hydraulic actuator to avoid drag when the clutch is normally released.

Hydraulic clutches in a rotating clutch assembly are normally actuated by pressurizing fluid in the pressurizing chamber of the hydraulic actuator which applies a force to a clutch disk stack to engage the clutch. When the pressure to the clutch is released, the clutch is only partially released because a portion of hydraulic fluid is retained in the supply passage and the pressurizing chamber in which centrifugal forces due to the rotation of the clutch produces a residual pressure in the pressurizing chamber. This force can be sufficient to cause a drag on the clutch disks which is objectionable. To relieve the residual pressure, valves have been provided in communication with the pressurizing chamber which act to relieve the hydraulic fluid. These relief valves operate to relieve the residual pressure in the pressurizing chamber of the hydraulic actuator but are not always completely satisfactory. The servicing of these valves can present a problem and because of inconvenience, the mounting of the valve within the clutch assembly may cause a contamination problem in the hydraulic oil and may require undue servicing. U.S. Pat. No. 2,642,844, Flinn, illustrates a valve assembly mounted within the rotating clutch for relieving of residual pressure in the hydraulic actuator. U.S. Pat. No. 3,534,840, Snoy, also discloses a relief valve in a clutch assembly for relieving the residual pressure in the hydraulic actuator. The relief valve shown in U.S. Pat. No. 2,642,844 is difficult to service and includes a spring biasing the valve radially inwardly to relieve residual pressure in the hydraulic actuator. Inertia forces operate on the valve in a radially outward direction and tend to operate against the spring. U.S. Pat. No. 3,534,840 shows a similar arrangement and is not provided with a means to assist the valve in moving to the release position other than centrifugal force. Contamination in the valve can cause ineffective relief of the residual pressure. The vent to the valve is in communication through a passage with the pressurizing chamber inwardly from the outer most portion of the pressurizing chamber.

The applicant has provided a valve which is easily assembled, easily serviced and positive in operation. The valve is positioned in a radial opening in the clutch housing and is fastened with a cover which threadedly engages the threaded outer portion of the opening to maintain the valve in the assembled position. The valve is in communication with the radially outer portion of the hydraulic actuating chamber to assure that all of the fluid is vented from the chamber and avoid any residual pressure in the actuating chamber which may tend to produce a drag on the clutch disks.

It is an object of this invention to provide a centrifugal hydraulic head relief valve for a rotating clutch.

It is another object of this invention to provide a hydraulically actuated friction clutch having a relief valve for relieving centrifugal hydraulic head in the pressurizing chamber of the hydraulic actuator when the clutch is disengaged.

It is a further object of this invention to provide a friction clutch having a relief valve for centrifugal hydraulic head opening responsive to centrifugal forces and a spring when the clutch is disengaged for closing responsive to clutch actuating pressure from the pressurizing chamber of the hydraulic actuator when the clutch is engaged.

The objects of this invention are accomplished in a rotating clutch having a hydraulic actuator to apply a load to frictionally engaging disks when the clutch is engaged. Centrifugal hydraulic head normally produced by inertia forces on the hydraulic fluid in the supply passage and pressurizing chamber is released by the relief valve in response to a spring force and inertia forces on the valve to overcome fluid pressure on a predetermined area of the valve to relieve the pressure in the hydraulic actuator when the clutch is disengaged. The forces can be controlled by design to operate independent of speed of rotation. This prevents the hydraulic fluid from causing a drag on the clutch normally due to residual pressure in the conventional hydraulic clutch. The relief valve is closed in response to pressure of the clutch actuating fluid in the pressurizing chamber of the hydraulic actuator when the clutch is engaged. The valve is positioned radially in a radial position of the clutch housing and in communication with the radially outer portion of the pressurizing chamber of the hydraulic actuator to assure venting of all fluid in the chamber and avoid any residual pressure in the chamber. The valve can be easily assembled or disassembled for servicing to avoid any malfunctions which may be caused due to contamination of the hydraulic fluid.

Referring to the drawings, the preferred embodiments of this invention are illustrated.

Figure 1:
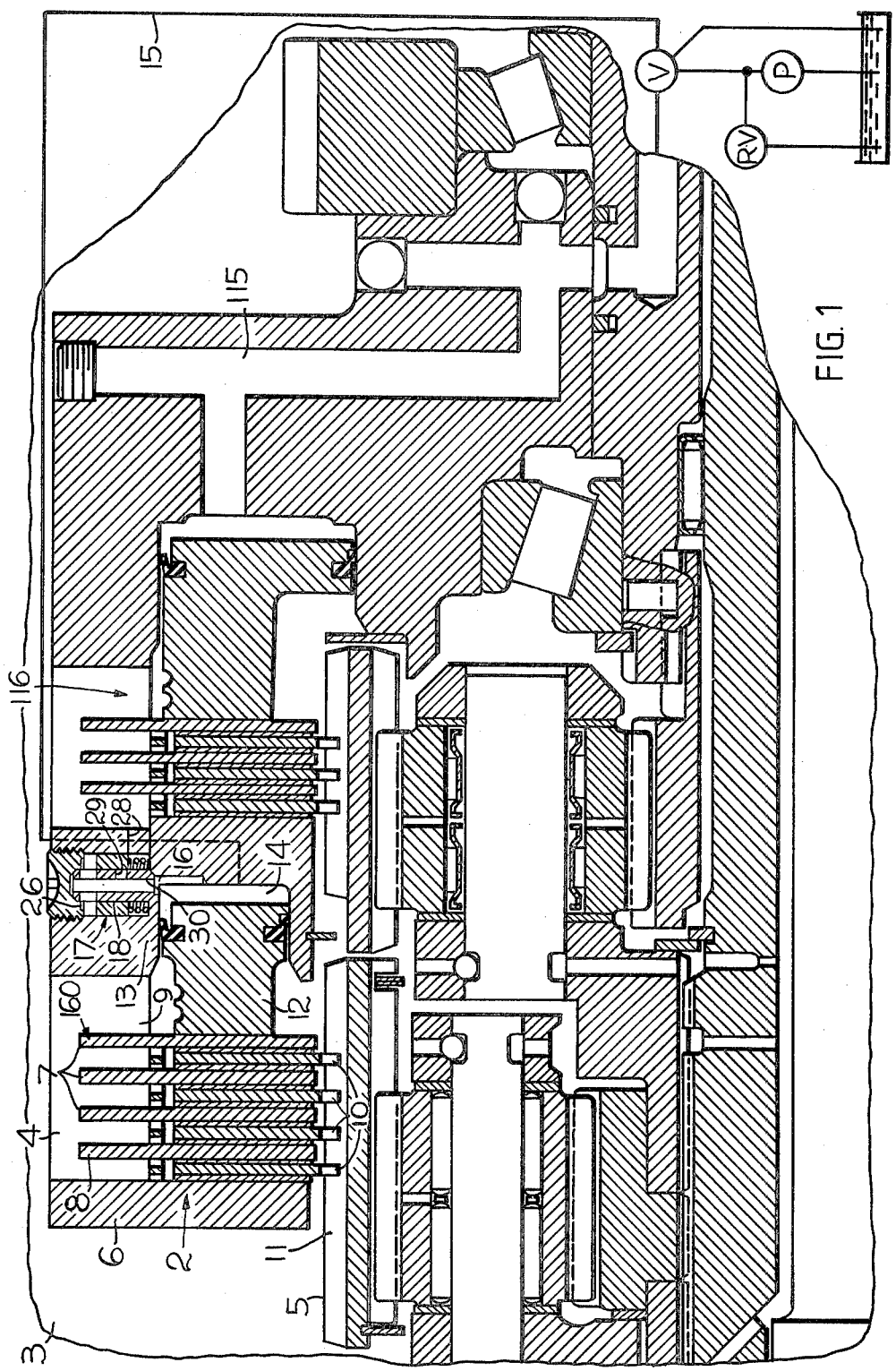
FIG. 1 illustrates a cross-section view of a hydraulically actuated rotating clutch and relief valve.

Referring to the drawings, the hydraulic clutch assembly includes a clutch 2. The transmission housing 3 encloses the rotating clutch assembly which includes a clutch drum 4 and a clutch hub 5. The reaction plate 6 is mounted on the end of the drum. The force actuating the clutch from the pressurized fluid acts on the end disk as the disc stack 160 is loaded. The disk stack 160 includes disks 7 carried by slots 9 of clutch disk 4. The disks 10 are carried on the spline 11 of the clutch hub 5. Normally, the piston 12 reciprocates within the cylinder 13 for engagement and disengagement of the clutch. The piston 12 forms a pressurizing chamber 14 with the cylinder 13. The supply passage 15 supplies pressurized fluid to the pressurizing chamber 14. A relief passage 16 communicates between the pressurizing chamber 14 and the relief valve 17.

The valve 17 consists essentially of a hollow shaft 18 seated in the central cone 19 at the base of the opening 20. A threaded portion 21 in the upper end of the opening threadedly receives the cover 22 which is in the form of a nut and can be tightened down against the shaft 18. The cover 22 is formed with a centering recess 23 which aligns the hollow shaft 18 within the opening 20. The cover 22 also firmly seats the shaft 18 within its operating position.

Figure 2:
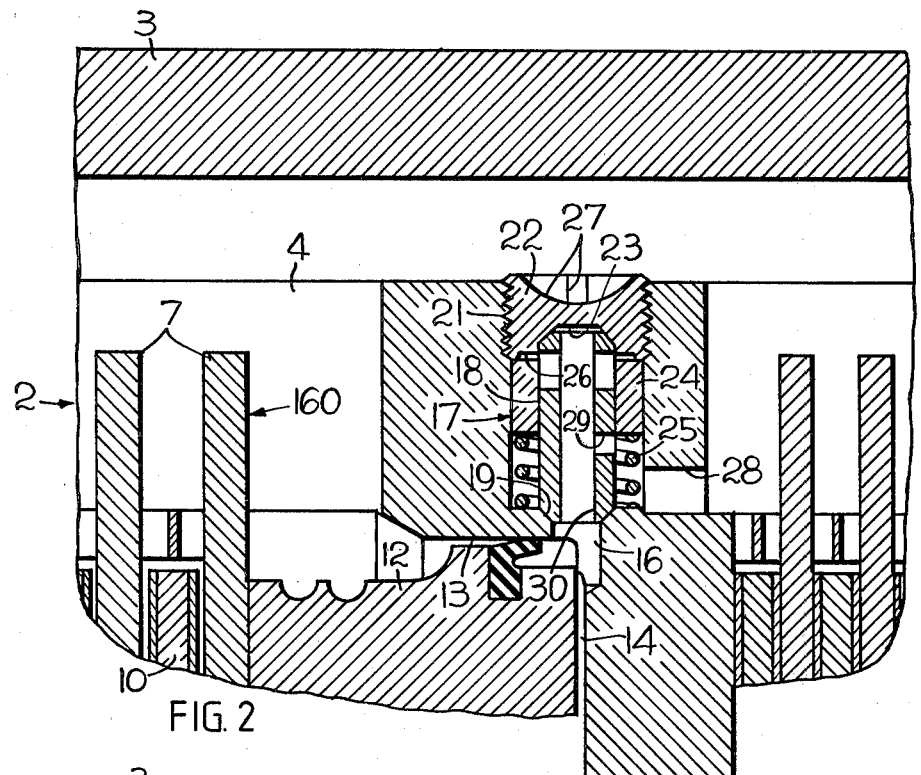
FIG. 2 is a cross-section view of the relief valve in communication with a pressurizing fluid chamber of a hydraulic actuator in the clutch. The relief valve is in the open position.

The valve sleeve 24 encircles the upper end of the hollow shaft 18 and is normally biased to the position as shown in FIG. 2 by the spring 25. A recess portion 26 provides a clearance between the upper end of sleeve 24 to allow fluid above the valve sleeve. A socket 27 is provided in the upper end of the cover 22 to allow easy assembly and disassembly of the valve.

The relief passage 16 is formed between the pressurizing chamber 14 and the valve 17. A vent passage 28 is provided radially from the valve to vent fluid from the valve when the relief valve 17 is in a position shown in FIG. 2. Radial passages 30 through hollow shaft 18 radially connect the central opening 30 with the recess 26. The radial passage 29 extends radially through the hollow shaft 18 to vent fluid from the central opening 30.

Pressurized fluid from the pressurizing chamber 14 is in communication through the relief passage 16 and the hollow center opening 30 of the relief valve 18. When hydraulic fluid is pressurized in the pressurizing chamber 14, the fluid is allowed to enter the recess 26 through passages 31, which biases the relief valve 24 downwardly to the position shown in FIG. 3 against the spring 25. In this position, the radial exit passage 29 is closed. The valve remains in this position as long as there is pressurized fluid in the pressurizing chamber 14. No fluid is allowed to flow through the vent 28.

The operation of the device will be described in the following paragraphs.

Referring to FIG. 1, the clutch assembly is rotatably mounted within the transmission housing 3. When the clutch 2 is disengaged, the spring 25 biases the relief valve 24 upwardly to the position as shown in FIG. 2. Fluid in the pressurizing chamber 14 is allowed to pass through the relief passage 16, through the central opening 30 and the radial exit openings 29 and also through the vent passage 28 to relieve the pressure in the pressurizing chamber 14. Normally, when the clutch drum 4 is rotating and the hydraulic clutch is disengaged, fluid in the pressurizing chamber is relieved to avoid partial engagement causing a drag on the clutch disks.

Figure 3:
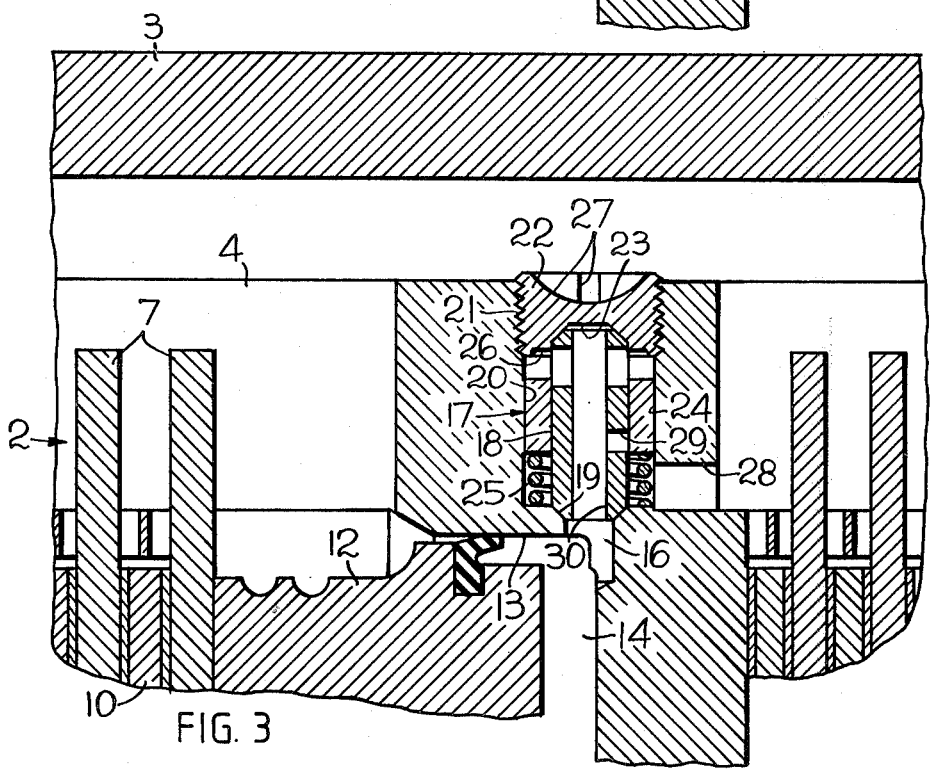
FIG. 3 is a cross-section view of the relief valve in communication with the pressurizing fluid chamber of the hydraulic actuator with the valve in the closed position.

When pressurized fluid is admitted through the supply passage 15 to the pressurizing chamber 14, the pressurized fluid also flows through the relief passage 16 and a central opening 30 of the hollow shaft 18. Pressurized fluid is allowed to flow through passages 31 into the recess 26 which biases the valve downwardly as shown in FIG. 3. The downward movement of the relief valve 24 closes the radial exit opening 29. This closes the valve and prevents escape of pressurized fluid from the pressurizing chamber 14 as the clutch is actuated. The valve will remain in this position so long as the pressure is great enough to compress the spring 25 to the position as shown in FIG. 3. When the clutch is released, the spring 25 and the centrifugal force on the relief valve 24 again extend radially outward to the position as shown in FIG. 2.

The relief valve closes at a predetermined pressure which moves the sleeve 24 downwardly against the force of the spring 25. A special feature of this invention is the way the valve is mounted in the clutch housing. When the clutch rotates, a centrifugal force will act on the sleeve 24 causing it to be forced in the same direction as the spring force. Centrifugal force will also act on the fluid in the pressurizing chamber 16 and all other fluid chambers connected to chamber 16 that rotate with the clutch housing. It is understood that although the supply passage is illustrated schematically, a supply passage similar to that of passage 115 for the clutch 116 might also be used. This would cause a force on the hydraulic fluid in the supply passage as well. The centrifugal force that acts on the hydraulic fluid in the supply passage, pressurizing chamber and the relief valve from the clutch rotation produces a pressure that acts on the area of the piston to bias it against the force of the spring 25. By design, the pressure times the area of the piston can be made equal to the centrifugal force acting on the sleeve 24 but in the opposite direction. If these forces cancel each other, then the valve operating pressure can be predetermined by the area of the sleeve and the spring load so that the valve opening pressure when measured at the valve is for all practical purposes independent of clutch rotating speeds.

The embodiments of the invention in which an exclusive property or privilege is claimed are defined as follows:

1. A hydraulic clutch having a centrifugal head relief valve comprising, a friction clutch including a plurality of rotating friction disks forming a disk stack, a hydraulic actuator defining a hydraulic fluid pressurizing chamber for engaging said friction disks of said disk stack, a relief valve in communication with said pressurizing chamber, said relief valve including an annular clutch drum defining a radial valve supporting opening and a vent passage, relief passage means connecting said pressurizing chamber with said valve, a valve aligning means concentrically mounted in said valve supporting opening providing connecting passage means and a vent opening between said vent passage and said relief passage means, a movable valve element reciprocally mounted in said valve supporting opening slidably engaging said valve aligning means and defining an expansible fluid pressure chamber, a valve cover removably retaining said valve aligning means concentrically within said opening, resilient means normally biasing said movable valve element radially outward, a central opening communicating with said connecting passage means in the outer end of said valve aligning means for admitting pressurized fluid to said expansible fluid pressure chamber to bias said movable valve element radially inwardly of said clutch drum to close said relief valve when fluid is pressurized in said pressurizing chamber and the clutch is engaged, said valve aligning means defining said vent opening extending to communicate with said vent passage in said clutch drum for release of fluid from said pressurizing chamber when said clutch is released.

2. A hydraulic clutch having a centrifugal head relief valve as set forth in claim 1 wherein said movable valve element moves radially outwardly responsive to centrifugal forces on said element, means defining a predetermined area of the radially outer surface on said movable valve element sensing fluid pressure responsive to fluid pressure produced from inertia forces on fluid in fluid passages and chambers in said rotating clutch to offset effect at varying inertia forces responsive to speed of rotation.

3. A hydraulic clutch having a centrifugal head relief valve as set forth in claim 1 wherein the minimum volume position of said valve element defines a pressure recess between the aligning means and valve cover to admit pressurized fluid at the radial outer end of said aligning means.

4. A hydraulic clutch having a centrifugal head relief valve as set forth in claim 1 wherein said valve cover defines a recess for receiving and aligning said valve aligning means in said valve supporting opening.

5. A hydraulic clutch having a centrifugal head relief valve as set forth in claim 1 including means defining said vent opening in the lower portion of said valve aligning means.

6. A hydraulic clutch having a centrifugal head relief valve as set forth in claim 1 wherein said cover includes means defining a recessed portion to receive the upper end of said valve aligning means, and a recessed portion centered in the lower portion of said valve supporting opening for centering said valve aligning means in said opening.

7. A hydraulic clutch having a centrifugal relief valve as set forth in claim 1 wherein said relief passage means extends radially inwardly from the valve supporting opening to the outer periphery of said pressurizing chamber.

8. A hydraulic clutch having a centrifugal head relief valve as set forth in claim 1 wherein the outer periphery of said pressurizing chamber extends to a point adjacent radially inner portion of said valve supporting opening.

9. A hydraulic clutch having a centrifugal head relief valve as set forth in claim 1 including means defining a spring chamber radially inwardly from said movable valve element.

10. A hydraulic clutch having a centrifugal head relief valve as set forth in claim 1 wherein said valve cover defines a threaded portion threadedly received in said valve supporting opening.

* * * * *